US006954438B2

(12) United States Patent
Morley et al.

(10) Patent No.: US 6,954,438 B2
(45) Date of Patent: Oct. 11, 2005

(54) WIRELESS CALLBACK ACCESS CONTROL FOR A LAN NETWORK ACCESS POINT

(75) Inventors: Kenneth S. Morley, Draper, UT (US); David J. Moore, Riverton, UT (US); Nick Thomas, Orem, UT (US); Dean Anthony Gratton, Peterborough (GB); Graeme Hickman, Harpenden (GB)

(73) Assignee: 3Com Corporation, Marlborough, MA (US)

( * ) Notice: Subject to any disclaimer, the term of this patent is extended or adjusted under 35 U.S.C. 154(b) by 823 days.

(21) Appl. No.: 09/790,243

(22) Filed: Feb. 21, 2001

(65) Prior Publication Data
US 2002/0145980 A1 Oct. 10, 2002

(51) Int. Cl.[7] .................................................. H04B 7/005
(52) U.S. Cl. .................... 370/278; 370/252; 709/209
(58) Field of Search ................................ 370/329, 328, 370/216, 242, 252, 278, 338, 244, 401, 480; 709/203, 208, 209, 210, 211, 249, 227; 364/570; 700/3; 714/6, 11, 43, 4, 2

(56) References Cited

U.S. PATENT DOCUMENTS

| 5,189,287 A | 2/1993 | Parienti ..................... 235/375 |
|---|---|---|
| 5,206,495 A | 4/1993 | Kreft .......................... 235/492 |
| 5,296,641 A | 3/1994 | Stelzel ......................... 84/602 |
| 5,336,099 A | 8/1994 | Aldous et al. .............. 439/131 |
| 5,343,319 A | 8/1994 | Moore ......................... 398/115 |
| 5,423,697 A | 6/1995 | MacGregor ................. 439/638 |
| 5,438,210 A | 8/1995 | Worley ......................... 257/82 |
| 5,440,449 A | 8/1995 | Sheer .......................... 361/686 |
| 5,445,525 A | 8/1995 | Broadbent et al. ............ 439/64 |
| 5,446,783 A | 8/1995 | May ............................. 455/557 |
| 5,451,933 A | 9/1995 | Stricklin et al. ............ 361/737 |
| 5,457,601 A | 10/1995 | Georgopulos et al. ...... 361/737 |
| 5,594,233 A | 1/1997 | Kenneth et al. ............ 235/492 |
| 5,594,680 A | 1/1997 | Ohtake et al. ................ 365/63 |
| 5,649,224 A | 7/1997 | Scheer ......................... 710/300 |
| 5,698,837 A | 12/1997 | Furuta .......................... 235/492 |
| 5,736,727 A | 4/1998 | Nakata et al. ............... 235/487 |
| 5,736,782 A | 4/1998 | Schairer ...................... 257/679 |
| 5,999,713 A | 12/1999 | Reiner et al. ............... 710/301 |
| 6,332,198 B1 * | 12/2001 | Simons et al. ................. 714/6 |
| 6,597,956 B1 * | 7/2003 | Aziz et al. ...................... 700/3 |
| 6,691,173 B2 * | 2/2004 | Morris et al. ............... 709/249 |
| 6,775,258 B1 * | 8/2004 | van Valkenburg et al. .. 370/338 |

* cited by examiner

Primary Examiner—John Pezzlo
(74) Attorney, Agent, or Firm—Workman Nydegger

(57) ABSTRACT

A master-slave switch method for reversing roles between nodes in a network environment when the traditional role reversal functionality as defined by the network specification is not implemented within the node is presented. A data terminal which does not support the traditional master-slave switch functionality, progresses as far as establishing an asynchronous connectionless (ACL) connection. The LAN access point then request a role switch, when the reversal of roles fails, the connection is aborted with device addresses of the participating entities being stored. The LAN access point then initiates the reestablishment of the connection in a master role with the data terminal assuming a slave role after verification of the device address of the LAN access point.

20 Claims, 7 Drawing Sheets

WIRELESS CALLBACK ACCESS CONTROL FOR A LAN NETWORK ACCESS POINT

BACKGROUND OF THE INVENTION

1. The Field of the Invention

The present invention relates to wireless access between a remote data terminal and a network node. More particularly, the present invention relates to determining and establishing a master/slave orientation during a communication session.

2. The Relevant Technology

The functionality of computing and communications has been converging for several years. There presently exists a tremendous growth of new types of electronic devices that enable users to communicate and access data over wireless links or channels, making computing and communications ubiquitous in all environments.

Because of the independent development of each of these devices, as well as variations in types of devices, interaction and networking of devices with each other had become a nightmare that required unique cabling and compatible interfaces for supporting the various interconnection approaches, many of which were held as proprietary by design. In order to facilitate communication between prospective devices, the user has been required to involve the use of special cables and software on each device in order to provid an agreeable interface. Such a device-specific interface fostered interconnection frustration and limited the usefulness of networking between devices. What was needed was a standardized wireless networking protocol that could be adopted and integrated by the various device manufactures that would enable seamless and compatible interconnection.

One such standard that has gained prominence is the Bluetooth standard ("Bluetooth"). The Bluetooth standard enables devices to communicate seamlessly without wires or other specific interconnection software. Bluetooth refers to an open specification technology for enabling short-range wireless voice and data communications anywhere in the world, with very few exceptions. Bluetooth is defined in a specification, Specification of the Bluetooth System, that addresses hardware and software requirements as well as applications and profiles that execute specific functionality in order to better facilitate the proliferation and acceptance of the standard.

From an implementation standpoint, for devices to communicate with each other using the Bluetooth standard, each communicating device either forms a network with another device, or joins an existing network as a new network member. Each of these networks is known as a piconet. A piconet includes a shared communications channel through which individual members communicate. Piconets are formed as needed and endure for as long as participating devices need to communicate. Bluetooth piconets are formed in a rather ad hoc manner. Each piconet has one and only one master and one or more slaves. These roles are temporary ones and they are meaningful only while Bluetooth devices are members of a piconet. Certainly, Bluetooth devices could be designed to function exclusively in either a master or a slave role as this is a system architecture design choice.

In addition to the ability of devices to assume a particular master or slave role, there are instances that necessitate that the roles of the master and slave be exchanged. For example, such an exchange is needed to implement the LAN access profile (LAP) (further described below) using a point-to-point protocol (PPP). To better appreciate the specific roles assumed by each of the devices, FIGS. 1–3 depict various device configurations and relationships. In FIG. 1, the case of establishment of a LAP between two individual computers, 100 and 102 is depicted. The LAP is essentially a procedure for establishing a PPP connection between the LAN access point and the data terminal. Once the PPP connection is established, conventional IP techniques may be employed. It should be pointed out that the PPP connection in the LAP is established directly over a packet-oriented data link.

The LAP defines device roles of a LAN access point (which may also be thought of as the data access point) and a data terminal (DT). The LAN access point exports PPP functionality and is connected to a LAN or WAN. The DT is the client of the LAN access point since it contains PPP client functionality, which is used to establish the connection with the LAN access point that in turn permits access to the LAN or WAN. The LAN access point must also assume the master role if it supports more than one data terminal. When only one data terminal is employed, for example when the LAN access point is dedicated to a single client or when the LAP is used for PPP networking between two devices, then it does not matter which device assumes the master role, but generally the LAN access point assumes the master role for LAP applications. A typical LAP configuration with a single data terminal 104 is illustrated in FIG. 2.

FIG. 3 depicts a LAP using a single LAN access point 106 and a plurality of data terminals 108, 110, and 112, operating in what is commonly referred to as multi-user mode. Clearly, in such an architecture where multiple data terminals exist or are possibilities, it is necessary to require that LAN access point 106 assume the master role in order to maintain and dictate the frequency hopping sequence and timing as well as dictating which slave data terminal may transmit at a given time.

Since device manufactures are free to select which Bluetooth performance features to include in their specific devices as well as others function to exclude from the devices, it is anticipated that many devices exist that have not implemented the master-slave switching process as defined in the Bluetooth specification. It should be recalled that this operation allows the roles of a master and slave to be switched when a data terminal acting as a master initiates a connection with a LAN access point operating in a multi-user mode master-slave switching is one of the requirements of the LAN Access Profile LAP. The LAP can be configured for two user—modes: multi-user and single-user. During single-user mode, the maximum number of users is one, providing exclusive access for the DT. This mode allows either the DT or the LAN access point to become master of the piconet. Multi-user mode allows multiple users to access the LAN access point and therefore dictates that the LAN access point must be the master of the piconet.

Briefly discussed below is a typical Bluetooth connection process that provides a basis upon which the invention may operate. FIG. 4 illustrates this process and a detailed treatment of this process is available in the Bluetooth specification, incorporated herein by reference.

From the DT's perspective, the connection process begins with the user initiating an inquiry function on the DT. The DT performs a device discovery process which looks for other available devices within range that are capable of being located. Once a device is identified, the DT retrieves service discovery protocol (SDP) service information about the devices found. The user may select the LAN access point and initiate the connection. It is assumed that authentication and other processes inherent in the Bluetooth specification have occurred, as understood by those of skill in the art.

From the LAN access point perspective, the LAN access point awaits a connection from a DT. Upon receiving an inquiry, the LAN access point provides details of its address and Bluetooth Clock to the DT. The DT request service information through further service discovery, the LAN access point presents the list of service it has available or the requested service information to the DT. The LAN access point accepts an incoming request from a DT to make the connection. Again, at this stage, it is assumed that authentication has taken place. Upon a successful connection between the LAN access point and the DT, the LAN access point then request a master-slave role switch so that the LAN access point may manage the piconet as the master.

The lack of mandated master-slave switching functionality in the DT, because of manufacture discretion, prohibits the ubiquitous, but switching deficient devices from engaging in a multi-user LAP. Therefore, it would be desirable to provide a method for allowing the DTs that lack switching functionality in a multi-user environment to assume a slave role thereby facilitating a multi-user architecture.

BRIEF SUMMARY OF THE INVENTION

An alternate approach to facilitating the role reversals between master and slave nodes in a network is provided. The Bluetooth specification LAN Access Profile specifies the operation of a multi-user LAN access point by requiring that when multi-user mode is employed, that is when more than one DT is allowed to interface with a LAN Access Point, then the LAN Access Point must become the master of the piconet. Many versions of DTs do not incorporate the traditional Bluetooth-specified master-slave switch functionality. The present invention facilitates a master-slave switch when the DT initiates the call.

The present invention establishes a connection between the DT and the LAN access point by executing the following summarized steps:

1. The LAN access point is placed in the general discoverable and connectable modes.
2. The potential DT knows of the LAN access point or discovered the Bluetooth Device Address (BD_ADDR), the device Bluetooth Clock, and Bluetooth device name of the LAN access point through a Bluetooth Device Discovery process.
3. The DT receives notification of the LAN access point SCE service support though the Services Request process.
4. The DT user selects the LAN access point for LAN access and the DT initiates a connection to the LAN access point. During this process, the LAN access point discovers the Bluetooth Device Address of the DT attempting to make the connection. The LAN access point checks the Link Manager Protocol (LMP) supported features of the DT. If the DT replies that is does not support the master-slave switch as defined by the Bluetooth specification, then the connection can be terminated. Alternatively, the connection is continued through a bonding procedure to allow the establishment of a link key.
5. The DT should be placed or remain in the connectable mode.
6. The LAN access point uses the Bluetooth Device Address of the DT and clock information to establish a connection with the DT for the purpose of providing LAN access to the DT.
7. If the DT detects the LAN access point establishing a connection with the DT, then the DT assumes that the LAN access point is doing so in order to provide LAN access and cooperatively engages in establishing the connection. The LAN access point and the DT continue establishing the connection to allow LAN access for the DT over a PPP connection.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
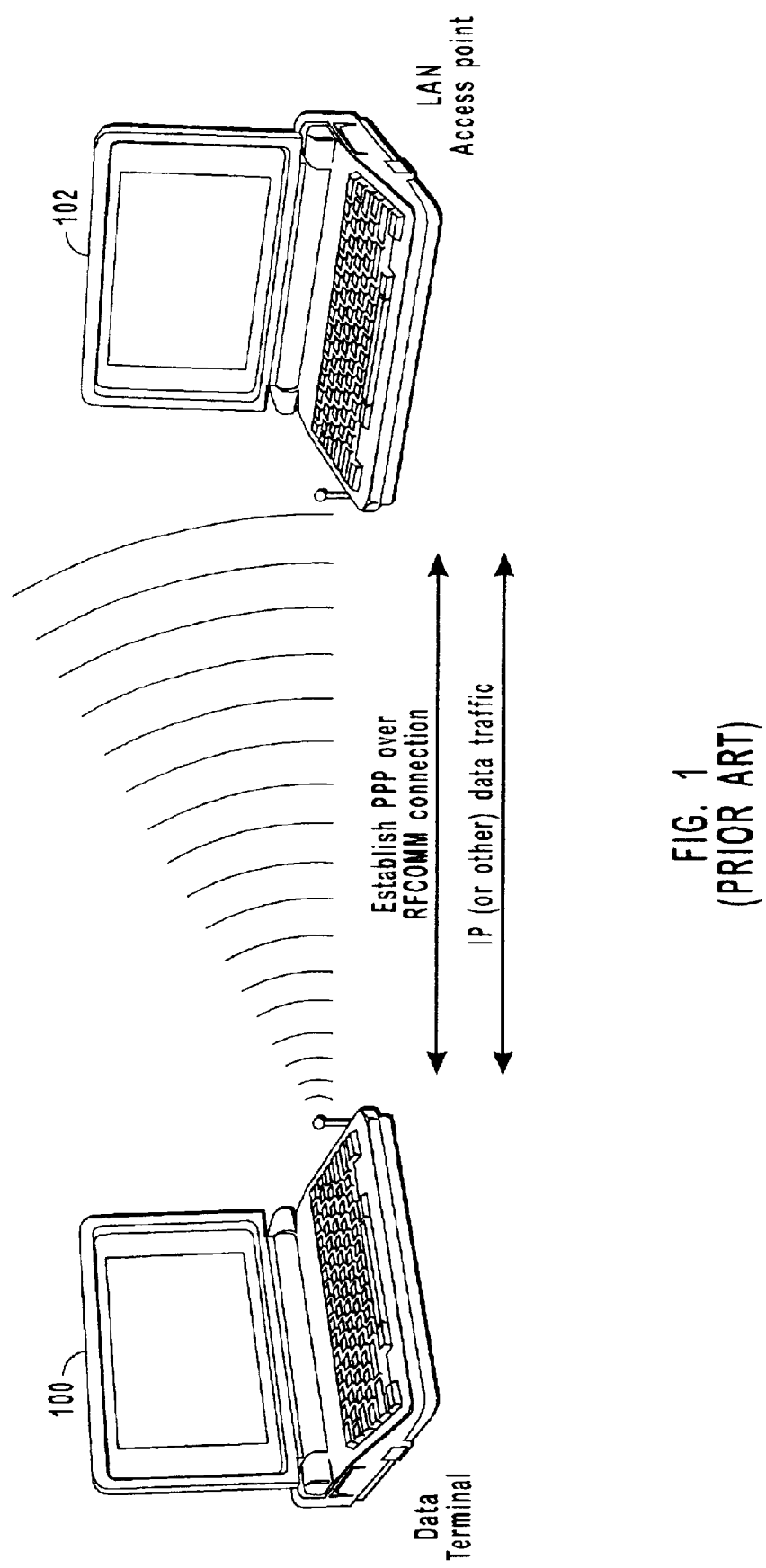
FIG. 1 illustrates a LAN access profile for networking between two devices, in accordance with the prior art.
Figure 2:
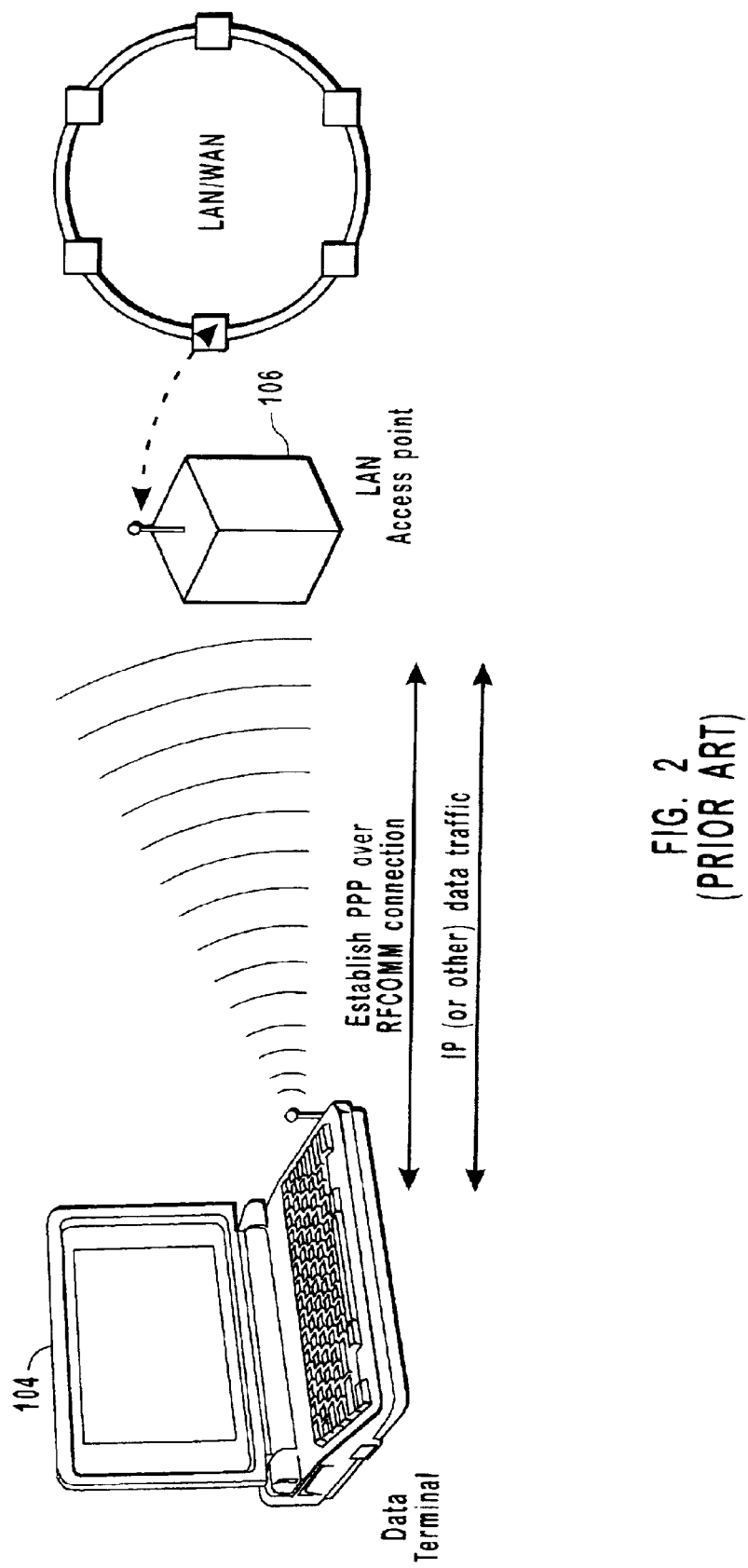
FIG. 2 illustrates a LAN access profile for networking between a LAN access point and a Data Terminal, in accordance with the prior art.
Figure 3:
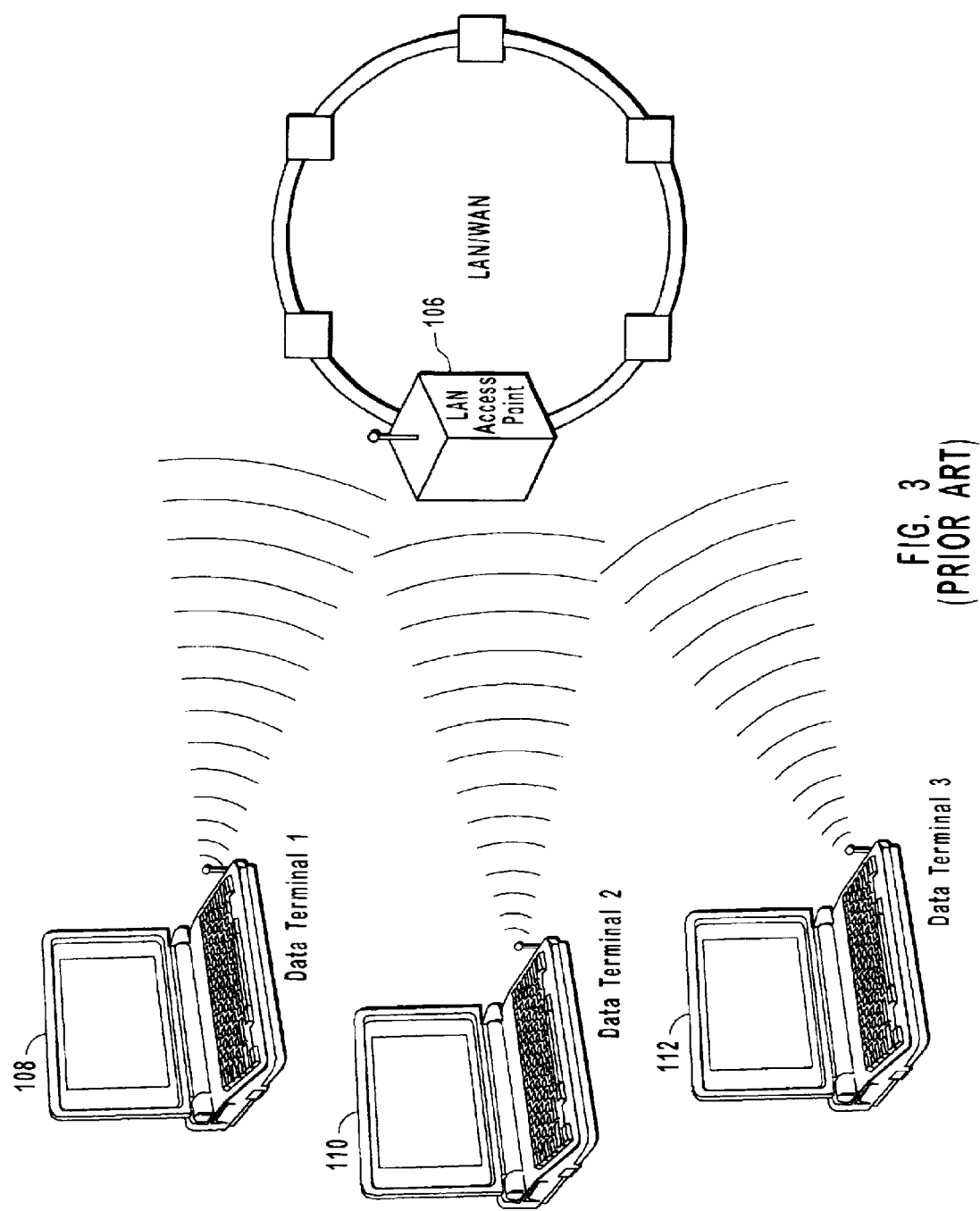
FIG. 3 illustrates a LAN access profile for networking between a LAN access point and a plurality of Data Terminals, in accordance with the prior art.
Figure 4:
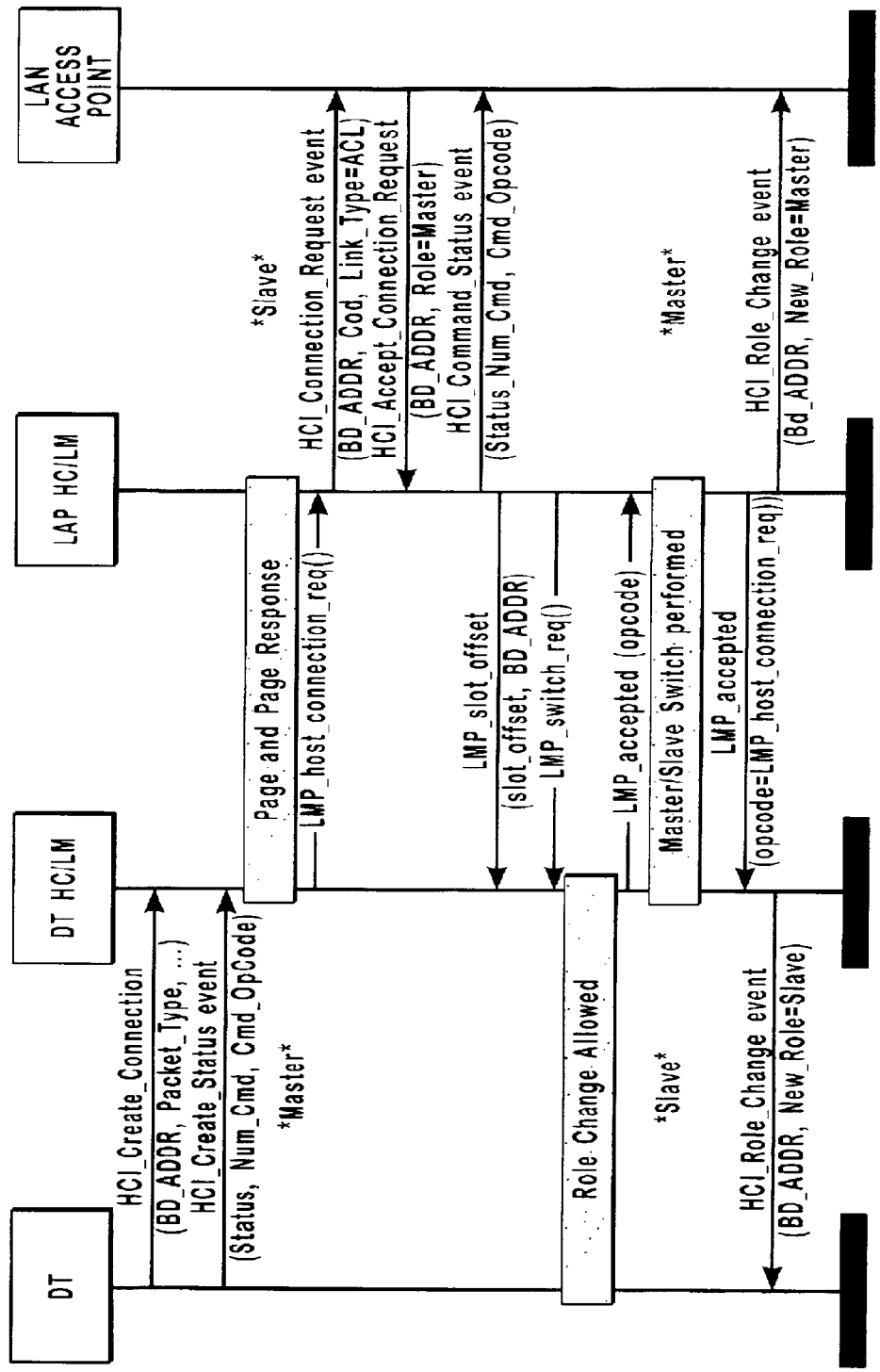
FIG. 4 is a flowchart of a master-slave switch for reversing roles between a Data Terminal and a LAN access point, in accordance with the prior art.
Figure 5:
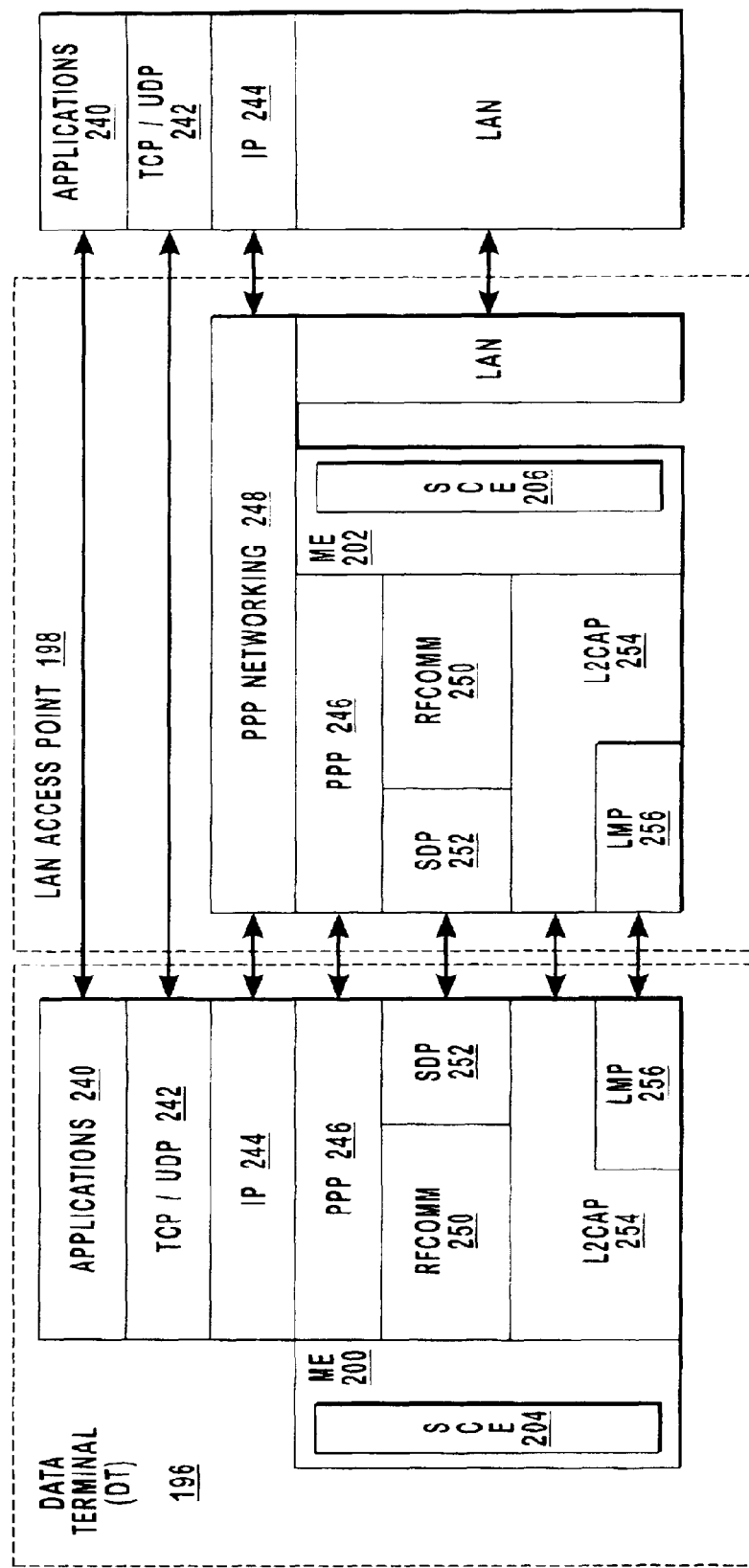
FIG. 5 is a block diagram of a Bluetooth stack for implementing the master-slave switch method for the LAN Access Profile, in accordance with the present invention.

A method for performing a master-slave switch or role reversal in a Bluetooth environment when a DT device does not support the master-slave switch or role reversal protocol as specified in the Bluetooth standard is presented. FIG. 5 depicts a high-level architectural presentation for the alternate master-slave switch or role reversal method procedure related to the LAN Access Profile, in accordance with the present invention. The present invention presents an extension to the LAP by adding to the Management Entity 200, 202 which exists within the LAP. A switch-callback entity (SCE) 204, 206 preferably exists within and alternatively outside of ME 200, 202 and assumes a silent role, (i.e., where it awaits a notification to do something from the ME). The role of SCE 204, 206 is to gain as much information about the connection entities as possible during the connection management process. ME 200, 202 provide information to SCE 204, 206 which is relevant to the failure of any connection. In the present invention, ME 200, 202 has the capability to divulge information to all layers within the Bluetooth architecture.

If the connection process is successful, the SCE 204, 206 assumes a silent role, where the connection continues as normal (i.e., consistent with the specification of the Bluetooth System, Volume 2, version 1.0 B) and the presence of SCE 204, 206 does not interfere or cause any interruption to the existing stack as defined by the Bluetooth specification. However, if the connections are unsuccessful due to, and only due to, the unsupported Bluetooth specification master-slave switch or role reversal function, then SCE 204, 206 is invoked to progress the connection into a successful state.

During a traditional connection process as defined in the Bluetooth specification, ME 200, 202 of DT 196 and LAN access point 198, respectively, manage incoming and outgoing connections. As such, both DT 196 and LAN access point 198 become aware of the failure of any traditional master-slave role reversal process. Such failure information is communicated to SCE 204, 206 where a determination is made regarding whether or not to institute a callback procedure. Both DT 196 and LAN access point 198 attempt to establish and ensure a successful connection when possible.

For example, DT 196 is aware that an outgoing connection to LAN access point 198 is in progress, however, if the connection fails due to the unsupported Bluetooth master-slave switch, then a switch-callback entity (SCE) within DT 196 constructs an SCE_Record, (i.e., a data unit which contains information about the remote device), of LAN access point 198 that it expects to receive a callback from. Such information is provided and retrieved by ME 200. In addition to preserving information contained within the SCE_Record, the only other component that is suggested for preservation is the PPP Client and higher stack entities. Such a preservation facilitates the incoming callback to proceed from the bottom-up as normal, where authentication and optional encryption remain unaffected. Furthermore, L2CAP and RFCOMM sessions can be created and RFCOMM is re-established, by SCE 204, to preserve the PPP Client session. Once DT 196 and LAN access point 198 have re-established a successful connection, then communication can occur.

Additionally, from the perspective of LAN access point 198, LAN access point 198 is aware of an incoming connection where information about the success or failure is provided by ME 202. During a failure of an incoming connection, as a result of the unsupported Bluetooth master-slave switch, SCE 206 constructs an SCE_Record, which preserves relevant information about DT 196 making the attempted switch. No other components within LAN access point 198 are required for preservation. If the failure is due to the unsupported Bluetooth master-slave switch functionality, then SCE 206 can instigate the callback procedure as described below. Upon re-establishing a connection with DT 196, LAN access point 198 creates a PPP Server session and consequently the related upper stack components.

The other elements of the protocol stack are not described in detail herein as they are commonly described throughout the Bluetooth specification and known by those of skill in the art, however, for completeness, summary statements about each element is provided below.

Applications 240 refers to actual applications that make use of Bluetooth links. Such application could be legacy application that are unaware of Bluetooth transports, such as a modem dialer application or web-browsing client or telephony applications.

TCP/UDP 242 and IP 244 elements refer to standard Internet protocols that facilitate peer-to-peer communications using standard network topology. PPP 246 and PPP networking 248 refers to functionality that connect to an IP network via a network access point as described in the LAP using PPP Profile. In that case, a Bluetooth link connects the device to a network access point. The Internet point-to-point protocol (PPP) is used over the Bluetooth link to connect to the access point. Once the PPP connection is established, standard Internet protocols can be used to interact with the network.

RFCOMM 250 refers to a protocol stack definition of a serial port abstraction which presents a virtual serial port to applications for facilitating the use of serial communications over Bluetooth wireless links.

SDP 252 refers to the service discovery protocol (SDP) standard method for Bluetooth devices that enables the discovery of the services offered by other devices and further provides a way for those devices to describe those service offered to other devices.

L2CAP 254 refers to the logical link control and adaptation protocol layer through which traffic from data applications is first routed. The L2CAP layer shields higher-layer protocols and applications from the details of the lower-layer transport protocols. Thus, higher layers need not be aware of the baseband specific functionality.

LMP 256 refers to the link manager protocol (LMP) which allows link managers in each device to negotiate the properties of the Bluetooth air-interface between them using the LMP. Such properties include bandwidth allocation to support a particular level of service.

Figure 6:
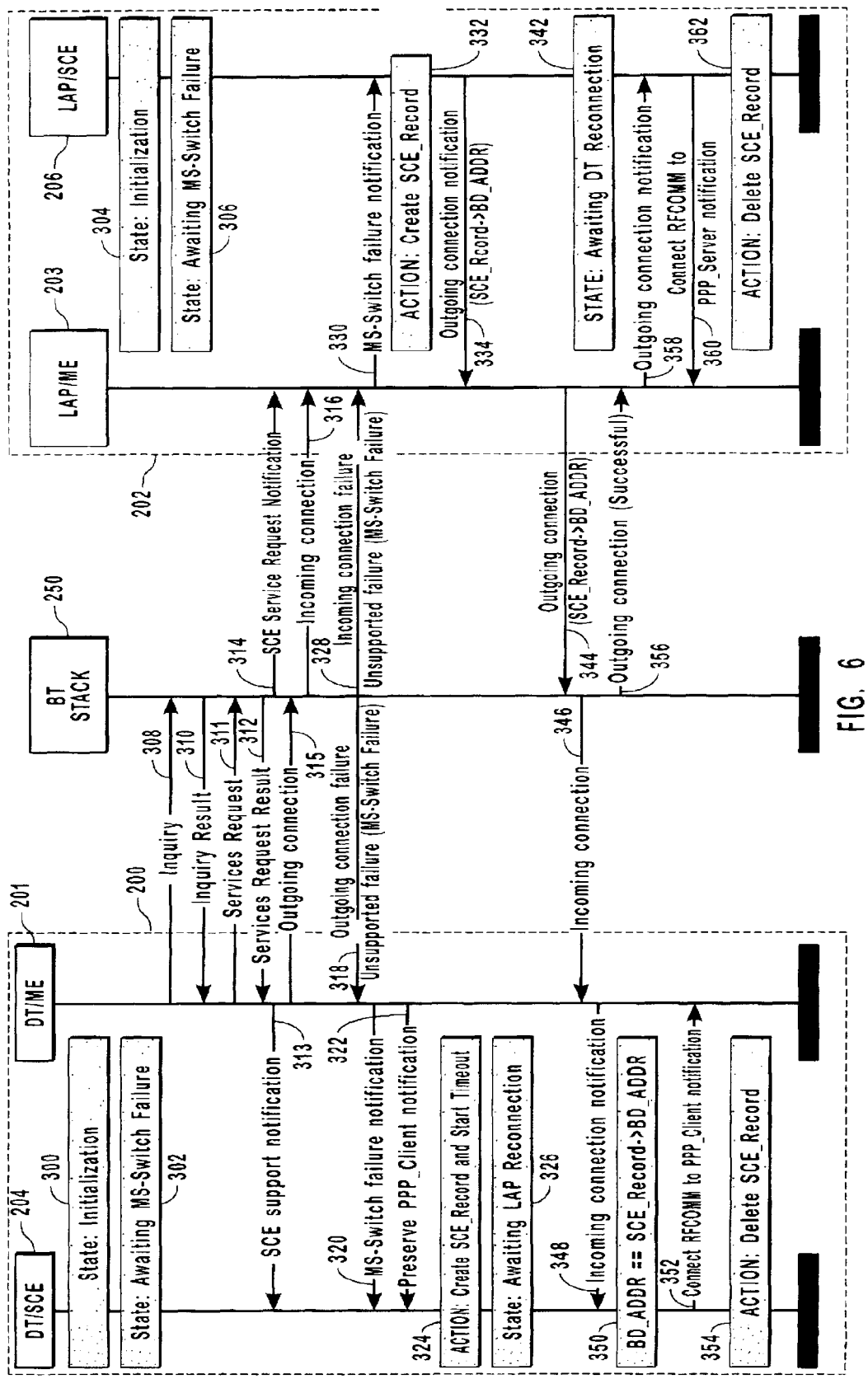
FIG. 6 is a flowchart of the master-slave switch method of the present invention, in accordance with a preferred embodiment.

FIG. 6 depicts a sequencing flowchart for events that occur for implementing the alternate master-slave switch connection, in accordance with a preferred embodiment of the present invention.

The present invention implements a stack structure, illustrated as Bluetooth stack 250, and illustrated in FIG. 5. The present invention further comprises a DT having an ME 200 and a LAN access point which includes an ME 202. Each ME 200 and 202 is preferably further comprised of an ME component 201, 203 and an SCE 204, 206, respectively.

As recalled, the SCE is responsible for managing and determining when to initiate the callback functionality of the alternate master-slave switch process. Both the DT and the LAN access point each perform initialization steps depicted as states 300 and 304, respectively. Each ME thereafter enters a wait state 302, 306 for awaiting a master-slave switch failure indication.

Since the master-slave switch function is only necessary in a multi-DT environment when a DT has initiated the connection, therefore only the scenario associated with a DT initiated connection is presented. DT initiated connections commence with an inquiry step 308 by the DT wherein a device discovery process begins. The discovered devices are returned in a step 310. A services request is then issued in step 311 by the DT to all LAN access points discovered requesting the SCE service information of these devices. The SCE service information of these devices is returned in services request result, step 312. The presence of SCE support in the LAN access point as determined by the returned data in the result service request from the available LAN access point devices and passed to SCE in a step 313 by issuing a SCE service request notification to the LAPIME 203. This notification indicates to the LAN access point that the DT is aware of the SCE service features and is capable of receiving a callback. In the preferred embodiment, SCE support is discovered by transporting indication of the capability through an SDP_Service_Record. The following table provides the ServiceClass definition for recognizing SCE support in the remote device. This method makes use of the existing functionality offered within Bluetooth and as such requires no structural changes to implementation of the Bluetooth specification.

In a step 324, the DT creates an SCE_Record which contains information about the remote device, such as its BD_ADDR (i.e., unique Bluetooth device address that is publicly known), and the DT also starts a timeout which defines an acceptable timeframe within which the callback must occur. It is preferred that the DT operate a timeout procedure where attempted connections can terminate gracefully.

In a step 332, the LAN access point also creates an SCE_Record containing information about the remote (DT)

| ITEM | DEFINITION | REQUIRED | TYPE | VALUE | DEFAULT |
|---|---|---|---|---|---|
| ServiceClassIDList | | M | | | |
| ServiceClass0 | UUID for "LAN Access using PPP" | M | UUID | | |
| ServiceClass1 | UUID for "LAN Access using PPP with SCE Support" | M | UUID | Obtained from BQA | Obtained from BQA |
| ProtocolDescriptionList | | M | | | |
| Protocol0 | UUID for L2CAP protocol | M | UUID | | |
| protocol1 | UUID for RFCOMM protocol | M. | UUID | | |
| Parameter0 | Server channel | M | Uint8 | Varies | varies |
| ProfileDescriptionList | | O | | | |
| Profile #0 | UUID for "LAN Access using PPP" | | UUID | | |
| Parameter0 | Version "1.00" | | Unit16 | 0 × 0100 | 0 × 0100 |
| Service Name | Displayable name | O | String | Configurable | 'LAN Access using PPP' |
| Service Description | Displayable Information | O | String | Configuration | 'LAN Access using PPP' |
| Service Availability | Load Factor | O | Uint8 | Dynamic | Dynamic |
| IpSubnet | Displayable Information | O | String | Configuration | Configuration |
| Callback Switch | Displayable Information | O | Boolean | Configuration | Configuration |

In a step 315, the DT initiates an outgoing connection through the Bluetooth stack 250 directed at the SCE-capable LAN access point identified in the inquiry step 308 and services request step 311. Bluetooth stack 250, in step 316, issues an incoming connection request to ME 202. Integral with inquiry step 308 is the recognition that the LAN access point is operating in multi-user mode which initiates a traditional master-slave switch request. Such recognition that features are unsupported occurs at the lower levels in the Bluetooth stack where connections are attempted. When such an unsupported feature is detected, then both stacks in BT 250, (DT and LAN access point) generate connection failure indications designating the traditional master-slave switch as being an unsupported feature in steps 318 and 328, respectively. Both the DT and the LAN access point individually forward the traditional master-slave switch failure notification to their respective SCEs in steps 320 and 330.

In step 322, the DT's SCE may request ME 201 to preserve the PPP_Client notification. This allows the incoming callback to proceed from the bottom-up as normal, where the authentication and optional encryption remain unaffected. L2CAP and RFCOMM sessions can be created and RFCOMM is reestablished by the SCE to the preserved PPP Client session.

device for use in executing the callback function, including the BD_ADDR and Bluetooth Clock of the DT.

The LAN access point, in a step 334, initates the callback function by issuing an outgoing connection notification listing the BD_ADDR and Bluetooth Clock of the specific DT that immediately previously issued the incoming connection in step 316.

In a step 344, LAN access point's ME 202 initiates an outgoing connection listing the earlier-identified DT as the target DT as distinguished by the DT's BD_ADDR and Bluetooth Clock stored earlier. In step 346, the DT's ME receives an incoming connection and generates, in a step 348, an incoming connection notification to SCE 204. In step 350, a comparison of the connection initiating BD_ADDR with the identifier stored in the DT's SCE_Record earlier in step 324. If a match occurs, then a step 352 re-establishes RFCOMM to the preserved PPP client session. Alternatively the DT recreates the PPP client session and then a step 352 re-establishes RFCOMM to the new PPP client session and then a step 352 re-establishes RFCOMM to the new PPP client session. Assuming that the DT and LAN access point have re-established a successful connection, then communication can occur. In a step 354, DT's SCE 204 deletes the SCE_Record since the stored information is no longer needed.

Returning to the functionality of the LAN access point, in a step 356, BT stack 250, forwards a successful outgoing connection indication to ME process 203 which in turn forwards the notification on to SCE 206 in step 358. SCE 206 cooperatively connects RFCOMM to PPP_Server notification in step 360. In a cleanup step 362, SCE 206 deletes SCE_Record since the information stored in the record is no longer needed.

In summary, the Bluetooth System Specification version 1.0b Volume 2, LAN Access Profile (pp. 260–290) which specifies the operation of a multi-user LAN access point states, "Multi-user mode is when the maximum number of users is configured to allow more than one user. In this mode, the LAP [(LAN Access Point)] must always become the master of the piconet. If the DT refuses to allow the LAP [(LAN Access Point)] to become master, then the DT cannot gain access to the LAN." As stated, many implementations of DTs do not implement the traditional Bluetooth-defined master-slave switch required to allow the LAN access point to become master of the connection when the DT intitates the call. The present invention provides a method for allowing the necessary role reversal to occur through the above-detailed method when the Bluetooth defined master-slave switch has not been integrated.

Figure 7:
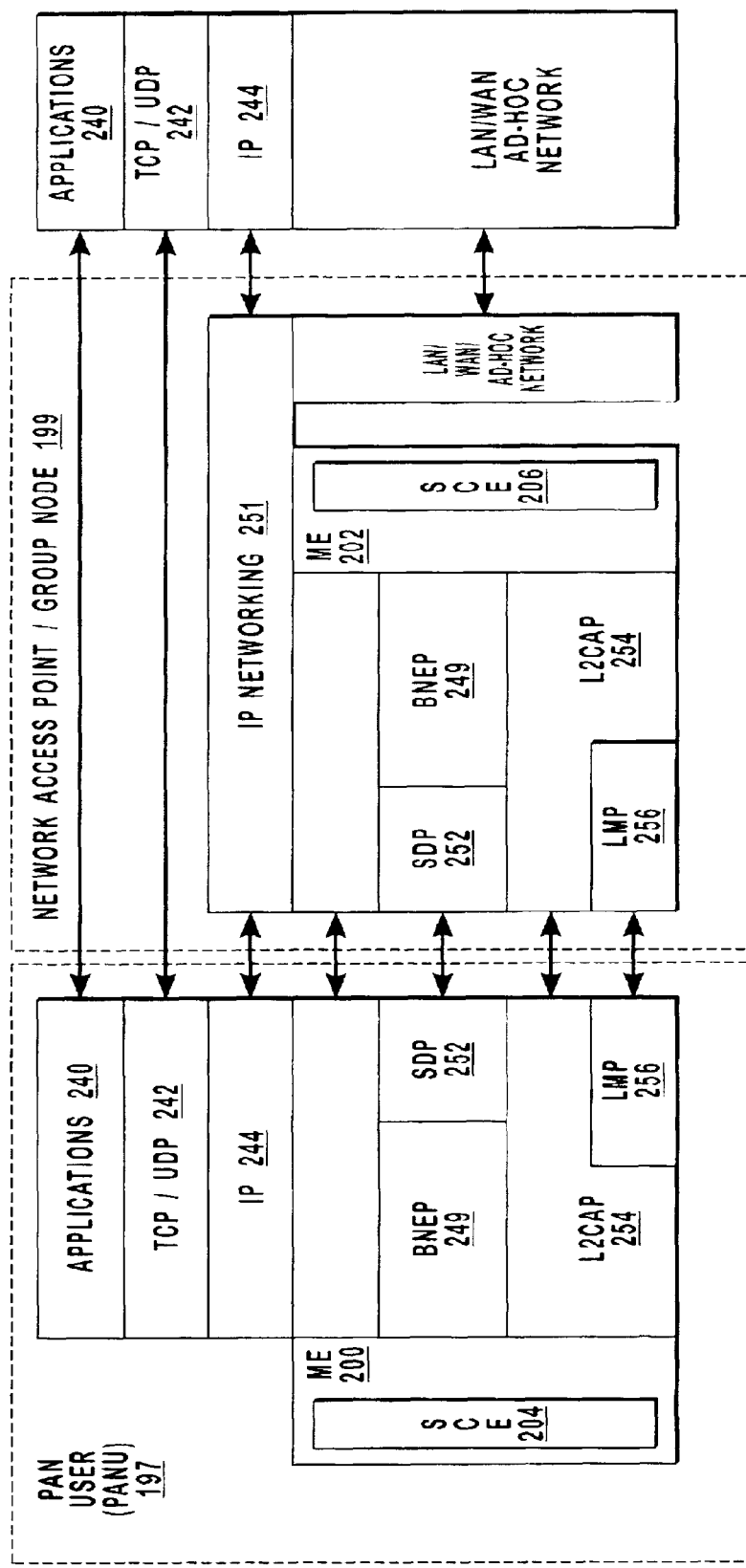
FIG. 7 is a block diagram of a Bluetooth stack for implementing the master-slave switch method for the PAN Profiles, in accordance with the present invention.

Referring to FIG. 7, in another embodiment of the invention, additional new profiles to be adopted by the Bluetooth SIG require the exchange of the master and slave roles are the PAN (Personal Area Network) Profiles. These profiles are known as the Group Network Profile (GNP) and the Network Access Point Profile (NAPP).

The PAN GNP defines device roles of Group Node (GN) and PAN User (PANU) 197. In this profile the role of the GN is similar to the role of the LAN access point in the LAP and the role of the PANU is the same as the DT in the LAP. The GN and PANU, or multiple PANU's establish an ad-hoc network over a Bluetooth link. A block diagram of a Bluetooth stack for implementing the master-slave switch method for the PAN Profiles, in accordance with the present invention is shown in FIG. 7.

The network data (IP packets in this case) is encapsulated using the Bluetooth Network Encapsulation Protocol (BNEP) 249 and transmitted over the Bluetooth link. BNEP 249 encapsulates standard network protocols through the usage of headers and formatting. Currently the PAN profiles assume IP v4 or IP v6 as the IP Networking 251 protocols to be used, but other networking protocols could be used. The GN provides routing functions between devices if more than one PANU is part of the ad-hoc network. The GN must assume the master role if it supports more than one PANU.

The PAN Network Access Profile defines the roles of Network Access Point (NAP) and PAN User (PANU). The PANU connects to the NAP to gain access to a LAN or WAN. The network connection is established as illustrated in FIG. 7. Network data is transported from the PANU to the NAP by encapsulating the network traffic over the Bluetooth link by using BNEP 249. The NAP provides network routing functions between devices attached to the NAP and between the devices and the network. The NAP must assume the master role if it supports more than one PANU. Other components of this embodiment perform similarly to the embodiment depicted in FIG. 5, described above, and are not redundantly repeated herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for reversing master-slave roles in a multi-user wireless network, comprising the steps of:
   (a) initiating an outgoing connection from a data terminal to a network access point operating in a multi-user mode, said data terminal assuming a master role and said network access point assuming a slave role in said connection;
   (b) said network access point requesting a master-slave switch;
   (c) reporting connection failure to said data terminal and said network access point due to unsupported master-slave switch function in said data terminal;
   (d) storing both a first device address of said network access point in said data terminal and a second device address of said data terminal in said network access point; and
   (e) said network access point initiating an outgoing connection from said network access point to said data terminal identified by said second device address stored in said network access point, said network access point assuming said master role and said data terminal assuming said slave role.

2. The method as recited in claim 1, wherein said initiating connection steps are performed in accordance with Bluetooth specifications.

3. The method as recited in claim 1, further comprising the step of:
   (a) prior to said initiating an outgoing connection from a data terminal step, said data terminal inquiring as to the identity of devices in the vicinity of said data terminal to learn of said first device address of said network access point.

4. The method as recited in claim 1, wherein the step of storing a first device address of said network access point in said data terminal further comprises the step of:
   (a) activating a timeout in said data terminal to define an acceptable callback timeframe within which to accept an incoming connection from said network access point as a master-slave role reversal with said data terminal assuming said slave role and said network access point assuming said master role.

5. The method as recited in claim 2, wherein said storing step comprises the steps of:
   (a) opening a record in both said data terminal and said network access point; and
   (b) storing both a first Bluetooth device address of said network access point in said record in said data terminal and a second Bluetooth device address of said data terminal in said record of said network access point; and
   (c) storing the Bluetooth clock of said data terminal in said record of said network access point.

6. The method as recited in claim 5, wherein said network access point initiating an outgoing connection from said network access point step comprises the step of:
   (a) said network access point initiating an outgoing connection from said network access point to said data terminal identified by said second Bluetooth device address stored in said record of said network access point and said network access point using the Bluetooth clock to facilitate the connection to said data terminal, said network access point assuming said master role and said data terminal assuming said slave role.

7. The method as recited in claim 1, wherein said storing step further comprises the step of:
   (a) storing both a link key of the connection between said network access point and said data terminal in said network access point and in said data terminal.

8. In a data terminal, a method for reversing master-slave roles in a multi-user wireless network, comprising:
   (a) initiating an outgoing connection from said data terminal to a network access point operating in a multi-user mode, said data terminal assuming a master role and said network access point assuming a slave role in said connection;
   (b) failing outgoing connection due to unsupported master-slave switch function in said data terminal;
   (c) storing a first device address of said network access point in said data terminal; and
   (d) receiving incoming connection from said network access point having an incoming device address matching said first device address stored in said data terminal, said data terminal assuming said slave role and said network access point assuming said master role in said incoming connection.

9. In a data terminal, the method as recited in claim 8, wherein said steps are performed in accordance with Bluetooth specifications.

10. In a data terminal, the method as recited in claim 8, further comprising the step of:
    (a) responding to a request from said network access point for a supported feature service record designating said data terminal as not supporting master-slave switch.

11. In a data terminal, the method as recited in claim 8, further comprising the step of:
    (a) prior to said initiating an outgoing connection from a data terminal step, said data terminal inquiring as to the identity of devices in the vicinity of said data terminal to learn of said first device address of said network access point.

12. In a data terminal, the method as recited in claim 8, wherein the step of storing a first device address of said network access point in said data terminal further comprises the step of:
    (a) activating a timeout in said data terminal to define an acceptable callback timeframe within which to accept an incoming connection from said network access point as a master-slave role reversal with said data terminal assuming said slave role and said network access point assuming said master role.

13. In a data terminal, the method as recited in claim 8, wherein said storing step comprises the steps of:
    (a) opening a record in said data terminal; and
    (b) storing a first Bluetooth device address of said network access point in said record in said data terminal.

14. In a data terminal, the method as recited in claim 8, wherein said storing step further comprises the step of:
    (a) storing a link key of the Bluetooth connection between said network access point and said data terminal in said data terminal.

15. A method for reversing roles in a master-slave network, comprising the steps of:
    (a) initiating an outgoing connection from a data terminal to a network access point operating in a multi-user mode, said data terminal assuming a master role and said network access point assuming a slave role in said connection;
    (b) terminating said outgoing connection;
    (c) storing in said network access point a device address of said data terminal; and
    (d) said network access point calling back said data terminal identified by said device address with an incoming connection to said data terminal.

16. The method as recited in claim 15, wherein said steps between said data terminal and said LAN access point are performed in accordance with Bluetooth specifications.

17. The method as recited in claim 15, wherein prior to said terminating step, said method further comprises the steps of:
    (a) said network access point requesting a master-slave switch; and
    (b) reporting connection failure to said data terminal and said network access point due to lack of functional support in said data terminal of said master-slave switch.

18. The method as recited in claim 15, further comprising the step of:
    (a) prior to said initiating an outgoing connection from a data terminal step, said data terminal inquiring as to the identity of devices in the vicinity of said data terminal to learn of said first device address of said network access point.

19. The method as recited in claim 15, wherein the step of storing in said network access point a device address of said data terminal further comprises the step of:
    (a) activating a timeout in said data terminal to define an acceptable callback timeframe within which to accept said incoming connection from said network access point as a master-slave role reversal with said data terminal assuming said slave role and said network access point assuming said master role.

20. The method as recited in claim 16, wherein said storing in said network access point a device address of said data terminal step comprises the steps of:
    (a) opening a record in both said data terminal and said network access point; and
    (b) storing both a first Bluetooth device address of said network access point in said record in said data terminal and a second Bluetooth device address of said data terminal in said record of said network access point; (c) storing a Bluetooth clock of said data terminal in said record of said network access point.

* * * * *